SWITCHING CIRCUITRY

Filed Feb. 19, 1953 4 Sheets-Sheet 1

INVENTOR.
ALBERT CLAUDE ARMSTRONG
JAMES GREGG DOUGHERTY JR.
WILLIAM LELAND FREIENMUTH
BY Theodore C Jay Jr
AGENT July 2, 1957 J. G. DOUGHERTY, JR., ET AL 2,798,153

SWITCHING CIRCUITRY

Filed Feb. 19, 1953 4 Sheets-Sheet 2

INVENTOR.
ALBERT CLAUDE ARMSTRONG
JAMES GREGG DOUGHERTY JR.
WILLIAM LELAND FREIENMUTH
BY Theodore C. Jay Jr.
AGENT July 2, 1957 J. G. DOUGHERTY, JR., ET AL 2,798,153

SWITCHING CIRCUITRY

Filed Feb. 19, 1953 4 Sheets-Sheet 3

INVENTOR.
ALBERT CLAUDE ARMSTRONG
JAMES GREGG DOUGHERTY JR.
WILLIAM LELAND FREIENMUTH
BY Theodore C Jay Jr.
AGENT

SWITCHING CIRCUITRY

Filed Feb. 19, 1953 4 Sheets-Sheet 4

INVENTOR.
ALBERT CLAUDE ARMSTRONG
JAMES GREGG DOUGHERTY JR.
WILLIAM LELAND FREIENMUTH
BY Theodore C Jay Jr.
AGENT

United States Patent Office 2,798,153

Patented July 2, 1957

2,798,153

SWITCHING CIRCUITRY

James Gregg Dougherty, Jr., Chevy Chase, William L. Freienmuth, Gaithersburg, and Albert C. Armstrong, Takoma Park, Md., assignors to Vitro Corporation of America, Verona, N. J.

Application February 19, 1953, Serial No. 337,866

8 Claims. (Cl. 250—27)

Our invention relates generally to electric signal handling apparatus and relates more particularly to switching circuits for use in this type of apparatus.

Such signal handling apparatus usually contains a matrix formed by a plurality of signal conducting lines or paths. Signals are routed through selected paths in this matrix, these paths being selected in accordance with the information carried by the signals. Special circuits called switching circuits are used to accomplish this selection.

The types of switching circuits to be used depend upon the type of information carried by the signals. For example, if this information is represented by an electrical signal which is subject to frequency variation, these circuits must be of one type; if the information is represented by a signal subject to amplitude variation these circuits must be of a second type. Our invention is directed toward the latter type of switching circuits.

It is an object of the present invention to provide novel switching circuitry of the character indicated.

Another object is to provide switching circuitry which will actuate certain paths and deactuate other paths when the amplitude of an incoming signal attains or exceeds a predetermined value.

Yet another object is to provide switching circuitry which will actuate certain paths and deactuate other paths when the amplitude of the incoming signal falls below a predetermined value.

Still another object is to provide switching circuitry which will actuate certain paths and deactuate other paths when the amplitude difference between two incoming signals attains or exceeds a predetermined value.

It is a further object to provide switching circuitry which will actuate certain paths and deactuate other paths when the amplitude difference between two incoming signals falls below a predetermined value.

Figure 1:
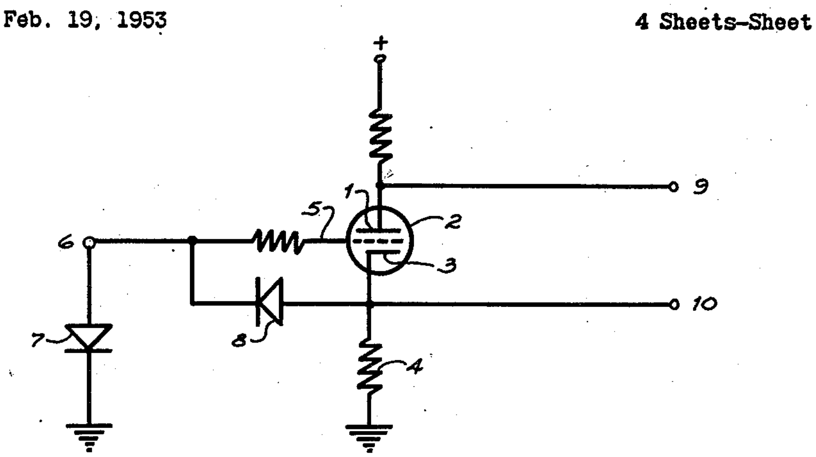
Figure 2A:
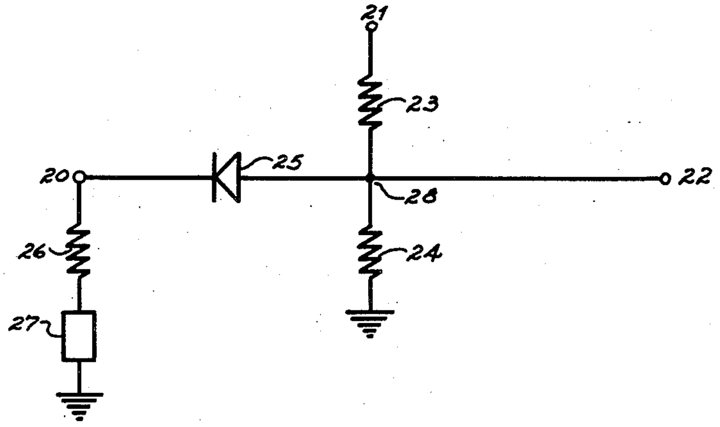
Figure 2B:
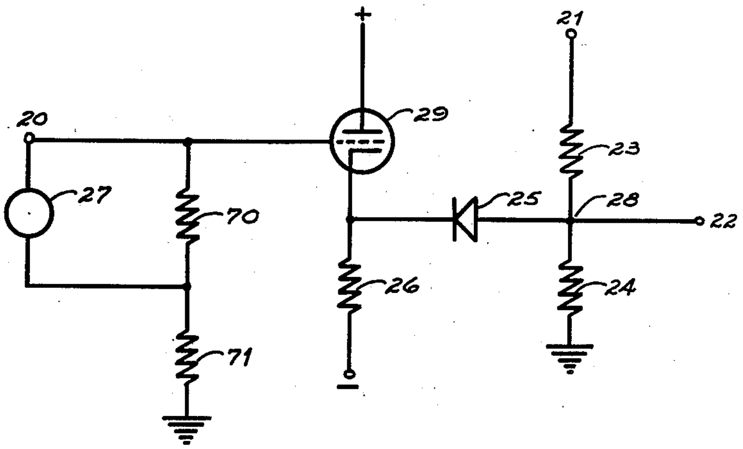
Figure 2C:
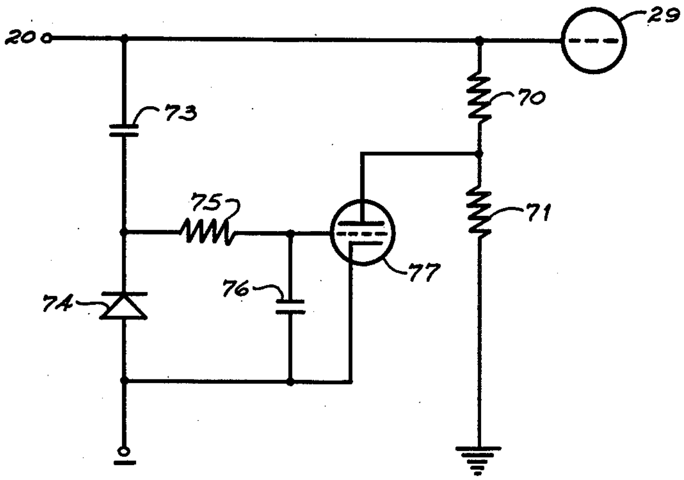
Figure 3A:
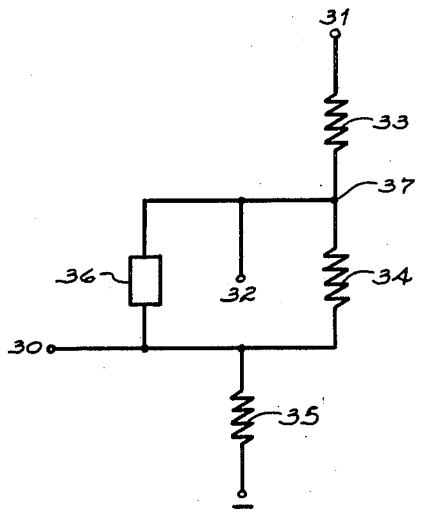
Figure 3B:
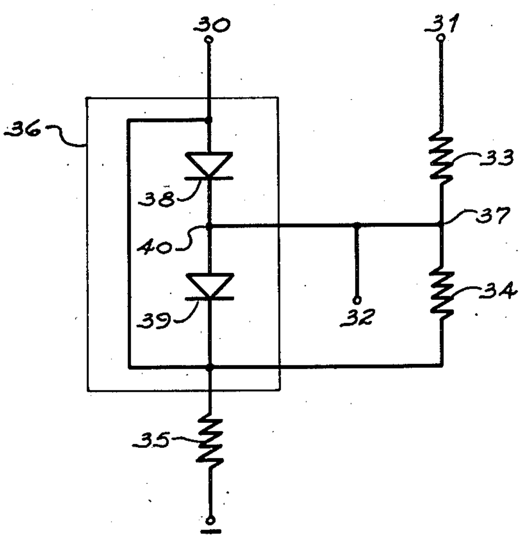
Figure 3C:
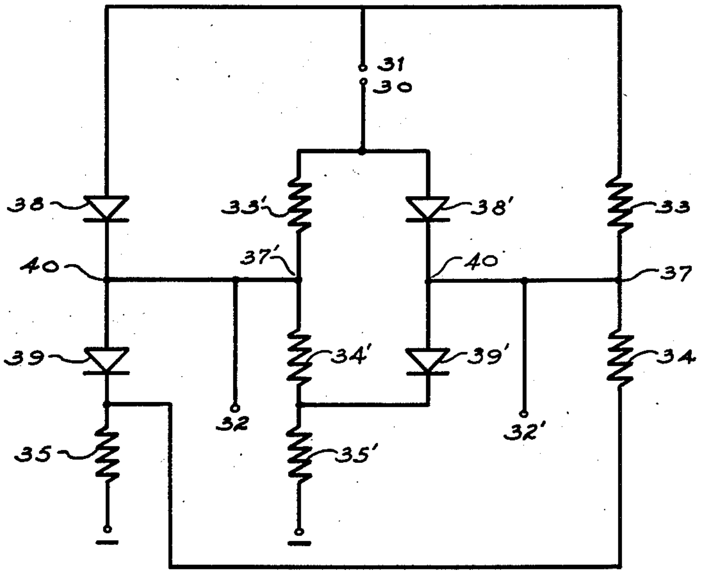
Figure 4:
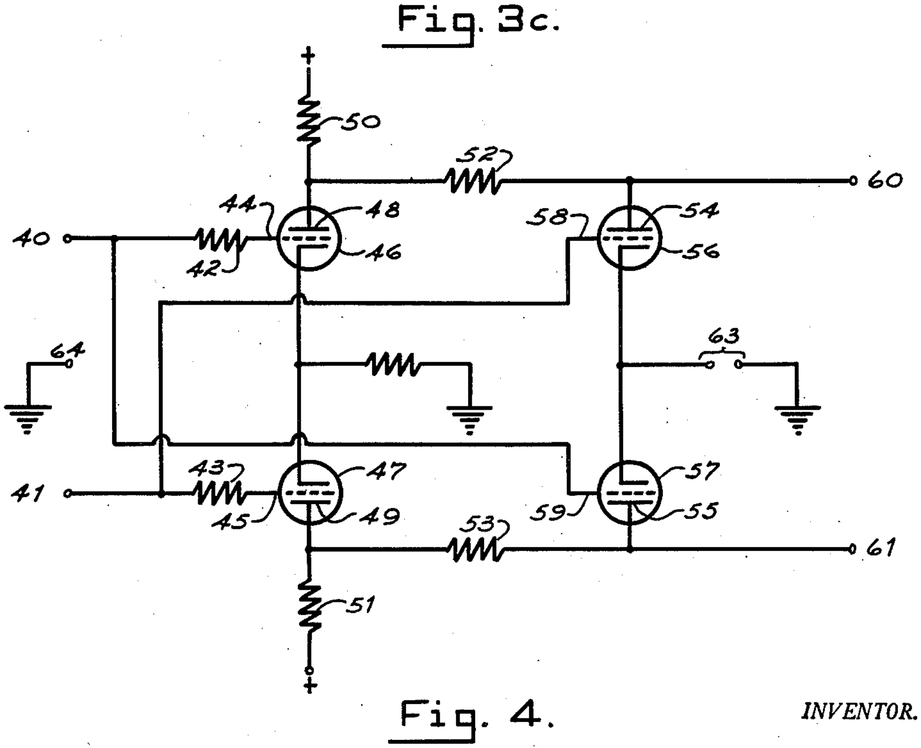

These and other objects of the invention will be explained or become apparent to one skilled in the art when this specification is read in conjunction with the accompanying drawings wherein:

Figure 1 shows a first embodiment of the present invention;

Figure 2*a* shows a second embodiment of the present invention;

Figure 2*b* shows a modified version of the embodiment shown in Figure 2*a*;

Figure 2*c* shows in schematic form a function generator indicated in block form in Figure 2*a* and Figure 2*b*;

Figure 3*a* shows in partial block form a third embodiment of the invention;

Figure 3*b* shows in schematic form this third embodiment;

Figure 3*c* shows a modified version of the embodiment shown in Figure 3*b*; and, Figure 4 shows a fourth embodiment of the present invention.

Briefly stated our invention comprises at least two conditionally responsive electric signal transfer lines, each of which when actuated forms a signal conducting path, and an electric network coupled to both lines or networks and responsive to one or more incoming signals subject to amplitude variation to actuate one of these networks and deactuate the other in accordance with these amplitude variations.

Referring now to Figure 1, the anode 1 of a high vacuum electric discharge valve tube 2 is coupled through an anode resistor to a point of positive operating potential. The cathode 3 of this valve is connected to ground through a cathode resistor 4. The grid 5 of the valve is connected through a grid resistor to an input terminal 6. Terminal 6 is clamped to ground through a binary element which represents either an open or a closed circuit depending upon the circuit condition. Such an element may be a germanium diode 7. Another diode 8 is connected between terminal 6 and cathode 3. An output terminal 9 is connected to anode 1 and another output terminal 10 is connected to cathode 3. (It will be seen that valve 2 and its associated terminals constitute a paraphase amplifier.) An incoming signal subject to amplitude variation is supplied to input terminal 6. This signal may either be alternating or direct in nature.

Diode 7 is so sensed that only positive portions of the incoming signal are supplied to the valve 2. When the amplitude of the positive portion of the incoming signal falls below a predetermined value determined by the circuit parameters, valve 2 acts as an amplifier, and an amplified signal 180° out of phase with the incoming signal appears at output terminal 9. In addition the current flow through the cathode resistor 4 produces a small voltage which is sufficient, however, to render diode 8 non-conductive. This cathode resistor voltage also appears at output terminal 10 but its magnitude is negligible for the purposes of the present invention. Consequently, substantially all of the incoming signal appears at terminal 9.

When the amplitude of the positive portion of the incoming signal equals or exceeds the predetermined value previously referred to, diode 8 conducts, establishing a very low impedance path for the incoming signal. Thus, substantially all of the incoming signal appears without phase change at terminal 10.

Consequently, that portion of the circuit formed between the grid-plate circuit of valve 2 and output terminal 9, constitutes a conditionally responsive signal transfer line, actuated when the signal amplitude falls below a predetermined value and deactuated when the signal equals or exceeds this value. Similarly, the portion of the circuit formed by the connection between the cathode of diode 8 and output terminal 10 forms a conditionally responsive line which, after actuation when diode 8 conducts, forms a signal conducting path between terminal 6 and terminal 10. Furthermore, diodes 7 and 8 form a closed circuit through ground with a cathode resistor 4, thus constituting an electric network coupled to both transfer lines or networks which actuates one of these networks and deactuates the other in accordance with the amplitude of the incoming signal.

It will be apparent that the switching circuit shown in Figure 1 can be so modified by reversing the sense of diode 7 and connecting the cathode resistor 4 to a point of negative potential instead of to ground, that the circuit will respond to negative rather than positive portions of the incoming signal. In this situation, the diode 8 will be rendered conductive when the signal amplitude falls below a predetermined value and will be rendered non-conductive when the amplitude equals or exceeds this value.

Figure 2*a* shows a second switching network. A first input terminal 21 is connected to ground through resistors 23 and 24; the junction 28 of these resistors is connected directly to output terminal 22 and is connected through diode 25 to a second input terminal 20. Terminal 20 is also connected to one end of resistor 26; the other end of resistor 26 is connected to one end of a function generator 27. The other end of this function generator is grounded. The purpose of this generator will appear hereinafter.

First and second incoming signals (which may be either alternating or direct in nature) are applied to terminals 21 and 20 respectively. The function generator derives a control voltage from the second signal and supplies this control voltage through resistor 26 to terminal 20. This voltage may be, for example, a direct voltage whose magnitude is an exponential function of the amplitude of the second signal. Thus, for small amplitudes, the control voltage is very small. As the amplitude of the second signal increases, the magnitude of the control voltage increases much more rapidly.

The polarity of the control voltage is so chosen that, for a small amplitude second signal, diode 25 is rendered nonconductive by the bias applied to it through resistor 26. In this situation, the first signal applied to terminal 21 appears across resistors 23 and 24 and therefore appears at output terminal 22.

For larger amplitudes of the second signal, the rapid increase in the control voltage causes diode 25 to conduct. At this point, the second signal is passed through diode 25 and appears across resistor 24 and output terminal 22. Since resistor 26 is much smaller than resistor 23, and since the control voltage is from a low impedance source, the first signal is so attenuated at junction 28 that substantially no portion of this signal appears at output terminal 22.

Therefore, it will be seen that the circuit formed by terminal 21, resistor 23, junction 28 and resistor 24 constitutes a first conditionally responsive signal transfer line actuated for small second signal amplitudes and deactuated for large second signal amplitudes. Similarly the circuit formed by terminal 20, diode 25 and output terminal 22 constitutes a second conditionally responsive line deactuated for small second signal amplitudes and actuated for larger second signal amplitudes. Furthermore, that portion of the circuit constituted by resistor 26 and function generator 27 and coupled between terminal 20 and the grounded side of resistor 24 forms an electric network coupled to both transfer lines or networks which actuates one network and deactuates the other in accordance with the amplitude of an incoming signal.

Figure 2*b* shows a modified version of the switching network shown in Figure 2*a*. All circuit elements having the same functions in both these figures are designated by the same numbers. When the amplitude of the second signal applied to terminal 20 is small, the value of the control voltage produced by the function generator 27 is also small and the effect of the biasing arrangement shown at the left in Figure 2*b* is to maintain diode 25 nonconducting, and the first incoming signal applied at terminal 21 appears at output terminal 22. For larger amplitudes of the second signal, the valve 29 is rendered more conductive and a voltage is produced across resistor 26 that renders diode 25 conductive. Valve 29 acts as a cathode follower; the second signal appears at terminal 22. Since cathode resistor 26 is much smaller than resistor 23, when diode 25 conducts, the first signal is so attenuated that substantially no portion of this signal appears at terminal 22.

Figure 2*c* shows schematically a control generator which may be used in the apparatus shown in Figure 2*b*. Terminal 20 is connected to the grid of valve 29 and is also connected through capacitor 73 to the anode of diode 74. The cathode of diode 74 is connected to a point of negative potential. The series combination of resistor 75 and capacitor 76 shunts diode 74. Capacitor 76 is also connected between the grid and cathode of valve 77. The anode of valve 77 is connected to the junction of resistors 70 and 71 which are connected in series between the grid of valve 29 and ground.

When the amplitude of the incoming signal applied at terminal 20 is small, diode 74 does not conduct. Capacitor 76 prevents a negative direct voltage from being supplied from the negative potential point to the grid of valve 77. Consequently valve 77 conducts heavily and pulls the potential of the grid of valve 29 to so low a value that this valve 29 is rendered only slightly conductive, if at all. For larger incoming signals, diode 74 suddenly conducts. At this point a negative direct voltage is supplied from the negative potential point through resistor 75 to the grid of valve 77 which may cut the valve off or at least allow it to conduct only slightly. The potential at the junction of resistors 70 and 71 rises abruptly and valve 29 conducts heavily.

Figure 3*a* shows in block form a third switching circuit. A first input terminal 30 is connected to a point of negative potential through a resistor 35. Terminal 30 is also connected through a block 36 to output terminal 32. The apparatus contained in block 36 has such electrical characteristics that a large potential difference applied across this block, irrespective of polarity, will cause the block to act as a short circuit connecting terminal 30 with terminal 32. A small potential difference applied across this block, irrespective of polarity, will cause the block to act as an open circuit between terminals 30 and 32. (A detailed description of the apparatus contained within this block will appear below.) A second input terminal 31 is connected through resistors 33, 34 and 35 to the point of negative potential and is also connected through resistor 33 and junction 37 to output terminal 32. The value of resistor 33 is much larger than the value of resistor 35.

If first and second incoming signals are applied to 30 and 31 respectively, and the amplitude difference between these signals is small, block 36 acts as an open circuit and only the second signal appears at output terminal 32. If the amplitude difference between these signals is large, block 36 acts as a closed circuit and the first signal appears at output terminal 32. Substantially no portion of the second signal appears at terminal 32 at this point due to the attenuating action of resistors 33 and 35.

Figure 3*b* shows one form of specific apparatus which may be contained in the block 36. This apparatus consists of two diodes 38 and 39 connected in parallel and in opposed senses. One end of the parallel connection is connected to terminal 30; the other end is connected to terminal 32. For small potential differences applied across this parallel circuit neither diode will conduct. (If desired, bias voltages may be applied to establish suitable conduction and non-conduction values for these diodes.) For larger potential differences one or the other of these diodes will conduct depending on the polarity of the applied potential. Consequently these diodes act in the required manner.

Thus that portion of this switching circuit formed by terminal 30, block 36 and terminal 32 constitutes a first conditionally responsive signal transfer line actuated when the amplitude difference between two incoming signals equals or exceeds a predetermined value and deactuated when the amplitude difference falls below this value. Similarly that portion of the switching circuit formed by terminal 31, resistor 33 and terminal 32 forms a second conditionally responsive signal transfer line actuated and deactuated in a reverse sense to that of the first network. Furthermore, the electric network formed by resistor 35, resistor 34 and the point of negative potential is coupled to both networks and actuates one and deactuates the other in accordance with the amplitude difference between two incoming signals.

Figure 3*c* shows a modified version of a switching network shown in Figure 3*b* wherein corresponding elements have the same numbers. Input terminal 31 is connected through diodes 38 and 39 to one end of resistor 35, the other end of resistor 35 being connected to a point of negative potential. The junction 40 between diodes 38 and 39 is connected to output terminal 32. Terminal 31 is also connected to resistor 33. Resistors 33 and 34 are connected in series and shunt diodes 38 and 39. The junction 37 between resistors 33 and 34 is connected to output terminal 32′.

Input terminal 30 is connected through resistors 33′, 34′ and 35′ to a point of negative potential. Terminal 30 is also connected through diodes 38′ and 39′ to the junction of resistors 34′ and 35′. The junction 40′ between diodes 38 and 39′ is connected to terminal 32′. The junction 37′ between resistors 33′ and 34′ is connected to terminal 32.

First and second incoming signals are applied to terminals 30 and 31 respectively. When the difference in amplitude between these two signals is small, no diode conducts and the second signal appears at terminal 32′ while the first signal appears at terminal 32.

When the difference in amplitude is large and the potential at terminal 31 is positive in respect to the potential at terminal 30, diodes 38′ and 39 are rendered conductive and diodes 38 and 39′ remain non-conductive. If the polarity of the amplitude difference is reversed and this difference remains large, diodes 38 and 39′ are rendered conductive and diodes 38′ and 39 are rendered non-conductive. In either case, the first signal appears at terminal 32′ while the second signal appears at terminal 32.

In all of the proceeding illustrations of our invention we have used diodes as on-off elements to actuate and deactuate signal conducting paths. It will be apparent to one skilled in the art that any binary element may be substituted for these diodes and the switching circuitry can be made operable in the manner heretofore discussed.

Figure 4 shows a fourth switching circuit. Input terminals 40 and 41 are connected through respective grid resistors 42 and 43 to the respective control grids 44 and 45 of valves 46 and 47. The anodes 48 and 49 of these valves are respectively connected through resistors 50 and 51 to a point of operating potential. These anodes are also respectively connected through resistors 52 and 53 to the anodes 54 and 55 of valves 56 and 57. Terminals 40 and 41 are respectively connected to the grids 59 and 58 of valves 57 and 56. Anodes 54 and 55 are respectively connected to output terminals 60 and 61. A bias voltage, sufficient to bias valves 56 and 57 beyond cutoff, is applied between the pair of terminals 63. The cathodes of valves 46 and 47 are connected to ground through a cathode resistor. Input terminal 64 is grounded.

First and second incoming signals balanced with respect to ground are applied between terminals 40 and 64 and terminals 41 and 64, respectively. These signals may be either direct or alternating in nature. In the first situation the polarity of the signals are opposed. In the second situation the signals are 180° out of phase with each other. In either case, it will be assumed that terminal 40 is instantaneously positive with respect to terminal 41. Therefore, an input voltage is applied between terminals 40 and 41 with the above-mentioned polarity. The magnitude of this voltage represents the algebraic sum of the two incoming signals. Valves 46 and 47 are biased for Class A operation and valves 56 and 57 are biased for Class C operation. When the incoming signals are small, the input voltage is small, and valves 46 and 47 act as linear amplifiers, while valves 56 and 57 remain non-conductive. Consequently, the input voltage, in amplified form, appears across output terminals 60 and 61 with terminal 61 being positive with respect to terminal 60. Thus, the pair of terminals 40 and 61 have the same polarity as does the pair of terminals 41 and 60. As the instantaneous polarity of the input voltage changes, the polarities of these terminal pairs also change but terminals 40 and 61 maintain the same polarity with respect to each other as do terminals 41 and 60.

Resistors 42 and 43 are grid limiting resistors. If the incoming signals are large and the instantaneous polarities of terminals 40 and 41 are the same as in the previous case, terminal 40 is highly positive and the limiting action of resistor 42 causes the voltage at anode 48 to resume its limited value. Terminal 41 is highly negative so that valve 47 is cut off or only slightly conducting and the voltage at anode 49 is substantially higher than the voltage at anode 48. Since the grid of valve 56 is connected to terminal 41, valve 56 is cut off and the voltage at anode 48 appears at terminal 60. Since the grid 59 of valve 57 is connected to terminal 40, the potential at grid 59 is sufficiently high to overcome the effect of the cut off bias and valve 57 conducts. By suitable choice of the circuit parameters, the conduction of valve 57 can be made so large that the voltage at anode 55 which appears at termial 61 will be smaller than the voltage appearing at terminal 60. In this situation the potential at terminals 40 and 60 is positive while the potential at terminals 41 and 61 are negative.

Consequently, for small incoming signals terminals 40 and 61 are effectively tied together as are terminals 41 and 60. For large incoming signals, the situation is reversed with terminals 40 and 60 being tied together and terminals 41 and 61 being tied together.

Therefore it will be seen that the portion of this switching circuit formed by terminal 40, the grid-anode portion of valve 46, resistor 52 and output terminal 60, constitutes a first conditionally responsive signal line actuated for small incoming signals and deactuated for large incoming signals. Similarly that portion formed by terminal 40, the grid-anode portion of valve 59 and output terminal 61 constitutes a second line actuated and deactuated in a reverse sense to that of the first network. Moreover that portion of the switching circuit consisting of input terminals 40, 41 and 64 and the grid-cathode circuits of all the valves constitutes an electric network which actuates one network and deactuates the other in accordance with the amplitude difference between the balanced incoming signals.

While we have shown and described and pointed out the fundamental novel features of the invention as applied to preferred embodiments, it will be understood that various omissions, substitutions and changes in the form and details of these embodiments may be made by those skilled in the art without departing from the spirit of the invention. It is our intention, therefore, to be limited only as indicated by the scope of the claims that follow.

We claim:

1. A switching circuit responsive to first and second incoming signals subject to amplitude variations, said network comprising a first network branch, one end of said first branch being designated as a first terminal, the other end of said first branch being coupled to a point of operating potential, said first branch including first, second and third resistors, the resistance of said third resistor being small with respect to said first resistor, the junction of said second and third resistors being designated as a second terminal, the junction of said first and second resistors being designated as third terminal, a second network branch connected between said second and third terminals, said second branch including an electric device having electrical characteristics at which said device represents a short circuit when the potential difference between said second and third terminals is large and represents an open circuit when this potential difference is small, and means to apply said first and second signals to said first and second terminals respectively whereby when the amplitude difference between said signals is small said first signal appears at said third terminal and when said amplitude difference is large said second signal appears at said third terminal.

2. A switching circuit as set forth in claim 1 wherein said electric device includes two diodes in parallel connection, said diodes having opposed senses.

3. A switching circuit responsive to first and second incoming signals subject to amplitude variation, said circuit comprising a first network branch including first, second and third resistors in serial connection, one end of said first branch being coupled to a point of operating potential, the other end of said first branch being designated as a first terminal, a second network branch including fourth, fifth and sixth resistors, one end of said second branch being coupled to said potential point, the other end of said second branch being designated as a second terminal, a third network branch including in serial connection first and second diodes having the same sense and shunting first and second resistors, a fourth network branch including in serial connection third and fourth diodes having the said same sense and shunting said fourth and fifth resistors, the junction of said first and second diodes being connected to the junction of said fourth and fifth resistors and designated as a third terminal, the junction of said third and fourth diodes being connected to the junction of said first and second resistors and designated as a fourth terminal, and means to apply said first and second signals to said first and second terminals respectively, said network branches responding to the amplitude difference between said signals in a first condition at which when said amplitude difference is small all of said diodes are rendered non-conductive and said first and second signals appear at said fourth and third terminals respectively and in a second condition at which when said amplitude difference is large a selected diode in each of said third and fourth branches is rendered conductive and said first and second signals appear at said third and fourth terminals respectively.

4. A switching circuit as set forth in claim 3 wherein when said network branches are in said second condition, said first and fourth diodes are rendered conductive when the amplitude difference has one selected instantaneous polarity, said second and third diodes being rendered conductive when said selected polarity is reversed.

5. A switching circuit responsive to first and second incoming signals subject to independent amplitude variation comprising first and second conditionally responsive signal lines, each line when actuated constituting a signal conducting path and when deactuated preventing signal passage therethrough, an electric network coupled to both lines and responsive to an amplitude difference between the two incoming signals greater than a reference value for actuating one of said lines and deactuating the other of said lines, said electric network responsive to an amplitude difference between the two incoming signals less than the reference value for deactuating the one line and actuating the other line.

6. A switching circuit as defined in claim 5, in which a first terminal is provided, the first conditionally responsive signal line comprising a first network branch including two resistors in serial connection, one end of said first branch being designated as a second terminal, the junction of said resistors being designated as a third terminal, the second conditionally responsive signal line comprising a diode coupled between said first and third terminals, the electric network comprising a second network branch coupled between the first terminal and the other end of said first branch, said second branch including in serial connection a function generator and a resistor, said second branch resistor having a value which is small with respect to the first branch resistor adjacent said second terminal, and means to apply said first and second signals to said first and second terminals respectively, said generator deriving from said first signal a control voltage which is small when said first signal is small and which increases more rapidly than said first signal as said first signal increases, said control voltage and said signals acting upon said diode to render said diode conductive when said first signal is large and to cut off said diode when said first signal is small whereby when said diode conducts said first signal appears at said third terminal and when said diode is cut off said second signal appears at said third terminal.

7. A switching circuit as defined in claim 6, wherein said function generator includes an input terminal, a first series circuit including first and second resistors connected between said terminal and a point of ground potential, a diode connected between said terminal and a point of negative potential, a second series circuit including a third resistor and a capacitor connected across said diode, and an electric valve coupled between the junction of said first and second resistors and said negative point to form a discharge path therebetween, said valve being provided with a control electrode coupled to the junction of said third resistor and said capacitor.

8. A switching circuit as defined in claim 5, in which a cathode follower circuit including a cathode resistor is provided, the cathode output of said cathode follower being designated as a first terminal, the first conditionally responsive signal line comprising a first network branch including two resistors in serial connnection, one end of the first branch being designated as a second terminal, the junction of said resistors being designated as a third terminal, the branch resistor adjacent to said second terminal having a value which is large with respect to the value of the cathode resistor, the second conditionally responsive signal line comprising a diode coupled between said first and second terminals, the electric network comprising a function generator included in the grid cathode circuit of the cathode follower, and means to apply said first and second signals to said first and second terminals respectively, said generator deriving from said first signal a control voltage which is small when said first signal is small and which increases more rapidly than said first signal as said first signal increases, said control voltage and said signals acting upon said diode to render said diode conductive when said first signal is large and to cut off said diode when said first signal is small whereby when said diode conducts said first signal appears at said third terminal and when said diode is cut off said second signal appears at said third terminal.

References Cited in the file of this patent

UNITED STATES PATENTS

| | | |
|---|---|---|
| 2,420,374 | Houghton | May 13, 1947 |
| 2,434,929 | Holland et al. | Jan. 27, 1948 |
| 2,443,195 | Pensyl | June 15, 1948 |
| 2,496,909 | Eberhard | Feb. 7, 1950 |
| 2,518,341 | Libois | Aug. 8, 1950 |
| 2,535,303 | Lewis | Dec. 26, 1950 |
| 2,541,039 | Cole | Feb. 13, 1951 |
| 2,542,152 | McConnell | Feb. 20, 1951 |
| 2,622,193 | Clayden | Dec. 16, 1952 |
| 2,703,364 | Birnbaum | Mar. 1, 1955 |